US00H002106H1

(19) United States

(12) Statutory Invention Registration

Bilgic et al.

(10) Reg. No.: US H2106 H

(43) Published: Jul. 6, 2004

(54) METHOD AND APPARATUS FOR MULTIPLE ACCESS COMMUNICATION

(75) Inventors: Izzet M. Bilgic, Colorado Springs, CO (US); Sherman Gavette, Colorado Springs, CO (US); Steve Howser, Colorado Springs, CO (US)

(73) Assignee: Opuswave Networks, Inc., Colorado Springs, CO (US)

(21) Appl. No.: 09/159,714

(22) Filed: Sep. 24, 1998

(65) Prior Publication Data

US 2001/0043572 A1 Nov. 22, 2001

(51) Int. Cl.[7] ..... H04J 1/00

(52) U.S. Cl. ..... 370/281

(58) Field of Search ..... 370/276, 277, 370/280, 281, 294, 295, 328, 330, 334, 344, 347, 436, 458, 912, 913; 709/248, 249, 250

(56) References Cited

U.S. PATENT DOCUMENTS

| | | | | | |
|---|---|---|---|---|---|
| 5,280,472 | A | * | 1/1994 | Gilhousen et al. | 370/18 |
| 5,781,541 | A | * | 7/1998 | Schneider | 370/335 |
| 6,031,831 | A | * | 2/2000 | Tan Boon et al. | 370/342 |
| 6,032,033 | A | * | 2/2000 | Morris et al. | 455/277.2 |
| 6,034,603 | A | | 3/2000 | Steeves | 340/572.1 |
| 6,094,421 | A | * | 7/2000 | Scott | 370/280 |
| 6,144,645 | A | * | 11/2000 | Struhsaker et al. | 370/280 |
| 6,233,227 | B1 | * | 5/2001 | Izumi | 370/280 |

* cited by examiner

*Primary Examiner*—Daniel T. Pihulic

(57) ABSTRACT

A virtual FDD base station comprises two base station sub-units each of which comprise a base station transmitter and a base station receiver. The first base station sub-unit transmits base-to-user messages to user stations only during a first half of a repeating time frame, and receives user-to-base messages from the user stations only during a second half of the time frame. The second base station sub-unit is preferably collocated with the first base station sub-unit and synchronized thereto, and transmits base-to-user messages to user stations only during half of the time frame, while receiving user-to-base messages from the user stations only during the other half of the time frame. Duplex communication channels are preferably defined by correlating a base transmit time slot with a user transmit time slot, which are separated by a sufficient amount of time to allow transmit/receive switching by a user station. The base station sub-units may be configured so that one of the sub-units transmits continuously and the other receives continuously, thereby providing full FDD functionality. In another embodiment, a TDD base station is adapted to support FDD communication. An over-the-air controller switches the transmit and receive operating frequency in accordance with a defined time slot communication pattern comprising base transmit time slots and user transmit time slots, and at the same time ensures that the base transmitter and base receiver are appropriately switched back and forth for connection with the base station antenna.

27 Claims, 11 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR MULTIPLE ACCESS COMMUNICATION

BACKGROUND OF THE INVENTION

1. Field of the Invention

The field of the present invention relates to a method and apparatus for multiple access communication.

2. Background

A variety of techniques are known for allowing multiple users to communicate with one or more fixed stations (i.e., base stations) by making use of shared communication resources. Examples of multiple access communication systems include, for example, cellular telephone networks and local wireless communication systems, such as wireless private branch exchange (PBX) networks. In such multiple access communication systems, transmissions from different sources may be distinguished in a variety of manners, such as on the basis of different frequencies, time slots, and/or codes, for example.

As used herein, a communication system in which transmissions are distinguished according to the transmission frequency may be referred to as a frequency division multiple access (FDMA) communication system. A communication system in which a forward link transmission over one frequency is paired with a reverse link transmission over a different frequency may be referred to as a frequency division duplex (FDD) communication system.

A communication system in which transmissions are distinguished according to the relative timing of the transmission (i.e., by use of time slots) may be referred to as a time division multiple access (TDMA) communication system. A communication system in which a forward link transmission during one time slot (or time segment) is paired with a reverse link transmission occurring during a different time slot (or time segment) may be referred to as a time division duplex (TDD) communication system. The DECT system is an example of a well known type of TDD communication system.

A communication system in which transmissions are distinguished according to which code is used to encode the transmission may be referred to as a code division multiple access (CDMA) communication system. In a CDMA communication system, the data to be transmitted is generally encoded in some fashion, in a manner which causes the signal to be "spread" over a broader frequency range and also typically causes the signal power to decrease as the frequency bandwidth is spread. At the receiver, the signal is decoded, which causes it to be "despread" and allows the original data to be recovered. Distinct codes can be used to distinguish transmissions, thereby allowing multiple simultaneous communication, albeit over a broader frequency band and generally at a lower power level than "narrowband" FDMA or TDMA systems. Different users may thereby transmit simultaneously over the same frequency without necessarily interfering with one another.

Various "hybrid" communication systems incorporating aspects of more than one multiple access communication technique have been developed or proposed. For example, a GSM system may be viewed as a "hybrid" communication system utilizing aspects of both FDD and TDMA. In a GSM system, each base station is assigned a transmission frequency band and reception frequency band. The base station transmits to each of its mobile stations using a transmission frequency within its assigned frequency band, and the mobile stations transmit to the base station using a frequency within the base station's reception frequency band. The transmissions to the user stations are sent in assigned time slots over the base station's transmission frequency, and the transmissions from the user stations are sent in corresponding assigned time slots over the base station's reception frequency.

While multiple access communication may be achieved using techniques of either FDMA, TDMA or CDMA, or certain variations (e.g., FDD or TDD) or combinations thereof, problems can occur if an equipment manufacturer or operator desires to migrate from one type of multiple access communication to a different type. This problem results from the fact that equipment manufactured specifically for any one type of multiple access communication system typically cannot be used with another type of multiple access system because of inherent differences in the nature of the communication techniques, leading to incompatibilities between the physical hardware as well as the communication protocols employed by the two communication systems. For example, a base station designed for TDD communication cannot be expected to communicate properly with an FDD handset, nor can it be expected that a TDD handset will communicate properly with a base station designed for FDD communication.

It may nevertheless be desired by equipment manufacturers or service providers to deploy or offer systems using different multiple access communication techniques or protocols, in order to serve different markets, geographical regions, or clientele, or for other reasons. However, to develop separate equipment for operation in different multiple access communication environments can substantially increase equipment design and manufacturing costs. Such a development process can also lead to the creation of different and incompatible protocols, which can require, for example, different types of backhaul service, leading to greater design expense to support the different backhaul formats and possibly duplicative base station controllers in the same local area, each servicing a different type of base station (i.e., FDD vs. TDD). Furthermore, an equipment manufacturer or service provider may desire to migrate from one type of multiple access communication and protocol to another type, without incurring substantial redesign costs.

It would therefore be advantageous to provide an apparatus and method allowing communication in more than one multiple access communication environment. It would further be advantageous to provide a method and apparatus for converting or adapting equipment from one type of multiple access communication service (e.g., TDD) to a different type (e.g., FDD).

SUMMARY OF THE INVENTION

The invention provides in certain aspects techniques for using or converting multiple access communication equipment to serve in a different multiple access communication environment.

In one embodiment, a base station within a communication system comprises two base station sub-units, preferably collocated, for performing virtual FDD communication. Each of the two base station sub-units comprises a base station transmitter and a base station receiver. The first base station sub-unit transmits base-to-user messages to user stations only during a first half of a repeating time frame, and receives user-to-base messages from the user stations only during a second half of the time frame. The second base station sub-unit is preferably collocated with the first base station sub-unit, and transmits base-to-user messages to user stations only during the second half of the time frame, while receiving user-to-base messages from the user stations only during the first half of said time frame. The two base station sub-units are preferably synchronized so as to maintain proper alignment of the time frame and of the time slots within the time frame.

In a second embodiment, a base station also comprises two base station sub-units. In the second embodiment, a time frame comprises a plurality of base transmit time slots defined with respect to a base transmit frequency band and a plurality of user transmit time slots defined with respect to a user transmit frequency band. The time frame is divided between the two base station sub-units such that the first base station sub-unit and second base station sub-unit each are assigned one half of the base transmit time slots and one half of the user transmit time slots. The base transmit time slots assigned to each base station sub-unit may form a contiguous block, or may alternate with one or more base transmit time slots assigned to the other base station sub-unit. Duplex communication channels are preferably defined by correlating a base transmit time slot with a user transmit time slot, with the base transmit time slots and user transmit time slot preferably separated by a sufficient amount of time to allow transmit/receive switching by a user station between the base transmit time slot and the user transmit time slot. Multiple time slots may be aggregated to a single user station in certain embodiments.

In another embodiment, a base station comprises a pair of modified TDD base station sub-units. One of the modified TDD base station sub-units is adapted to transmit continuously over a base transmit frequency band using its base station transmitter, while the other of the modified TDD base station sub-units is adapted to receive continuously over a user transmit frequency band using its base station receiver. A backhaul interface transmits information over a backhaul line from the modified TDD base station sub-unit that receives continuously, and transmits information from the backhaul line to the modified TDD base station sub-unit that transmits continuously, so as to support a plurality of duplex communication channels. The two modified TDD base station sub-units may, in one embodiment, pass appropriate synchronization and error correction information to one another over a signal interface.

In another embodiment, a TDD base station is adapted to support FDD communication. The TDD base station comprises a radio transceiver, an over-the-air controller, a memory buffer and backhaul interface. The over-the-air controller switches the transmit and receive operating frequency between a base transmit frequency band and a user transmit frequency band in accordance with a defined time slot communication pattern comprising base transmit time slots and user transmit time slots, and at the same time ensures that the base transmitter and base receiver are appropriately switched back and forth for connection with the base station antenna (or antennas). The modified TDD base station may toggle back and forth between base transmit time slots and user transmit time slots on a slot-by-slot basis, or else may switch the base transmit frequency band and user transmit frequency band after a predefined number of transmit time slots or user transmit time slots.

Further embodiments, modifications, variations and enhancements of the invention are also disclosed herein.

DETAILED DESCRIPTION OF PREFERRED EMBODIMENTS

Figure 1:
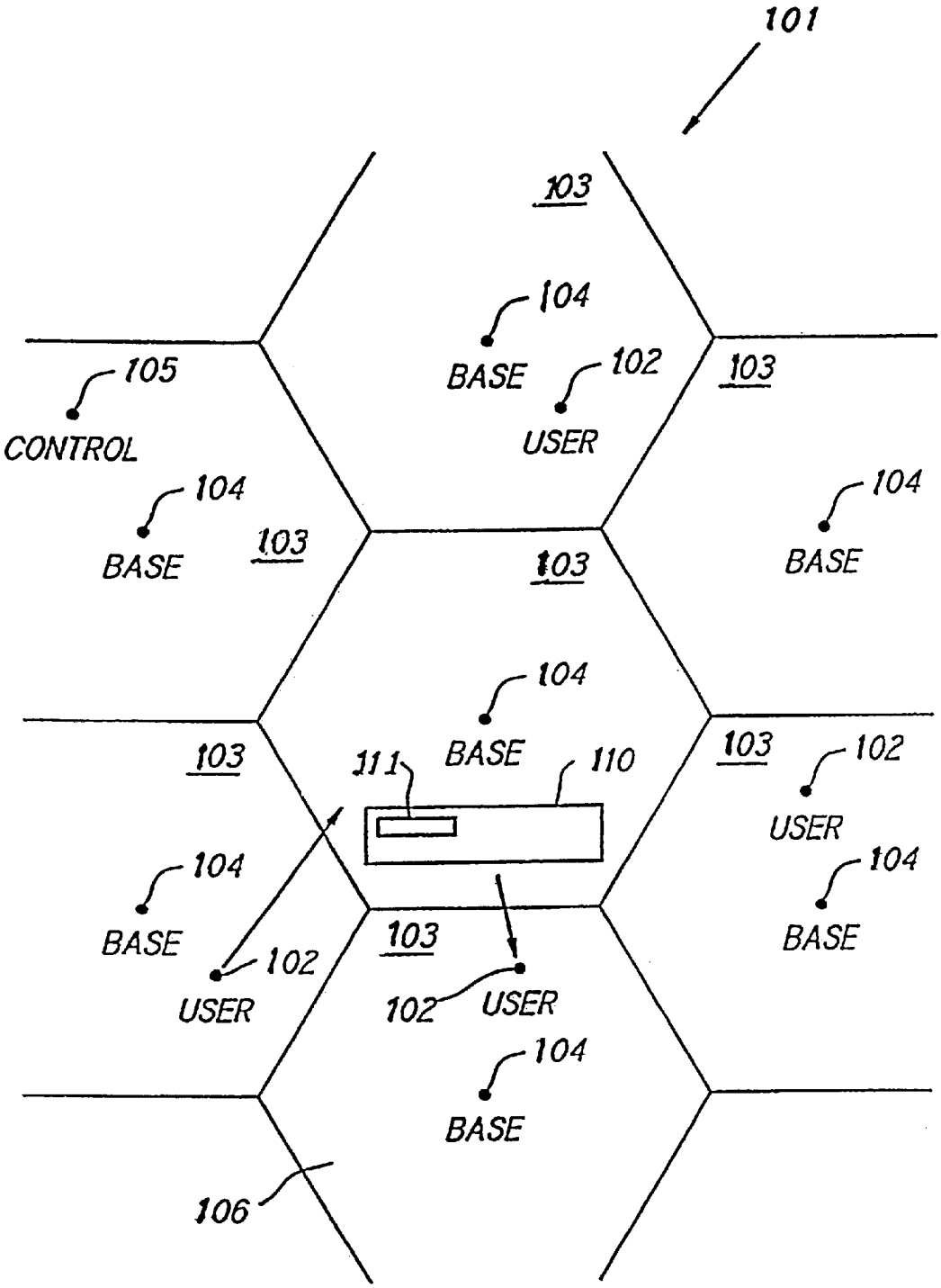
FIG. 1 is a diagram of a cellular system.

FIG. 1 is a diagram of a cellular communication system 101 having base stations and user stations. In FIG. 1, a communication system 101 for communication among a plurality of user stations 102 includes a plurality of cells 103, each with a base station 104, typically located at or near the center of the cell 103. Each station (both the base stations 104 and the user stations 102) may generally comprise a receiver and a transmitter. The user stations 102 and base stations 104 preferably communicate using frequency division duplex (FDD) techniques as further described herein, in which base stations 104 communicate over one frequency band and user stations 102 communicate over another frequency band. Communication is also conducted such that different user stations 102 transmit at different times (i.e., during different time slots), as further described herein.

As further shown in FIG. 1, the communication system 101 may also comprise a base station controller 105 which connects to the base stations 104 in a particular geographic region. The base station controller 105 aggregates inputs from multiple base stations 104 and relays information from the base stations 104 to a mobile switching center (MSC) (not shown) and ultimately to a public switched telephone network (PSTN, or "network") (not shown). The base station controller 105 also relays information from the network to the individual base stations 104. The base station controller 105 may, if necessary, perform conversion of signaling messages relating to such things as mobility management and call control, to make the signaling messages compatible with the communication protocol used by the base stations 104.

Figure 2:
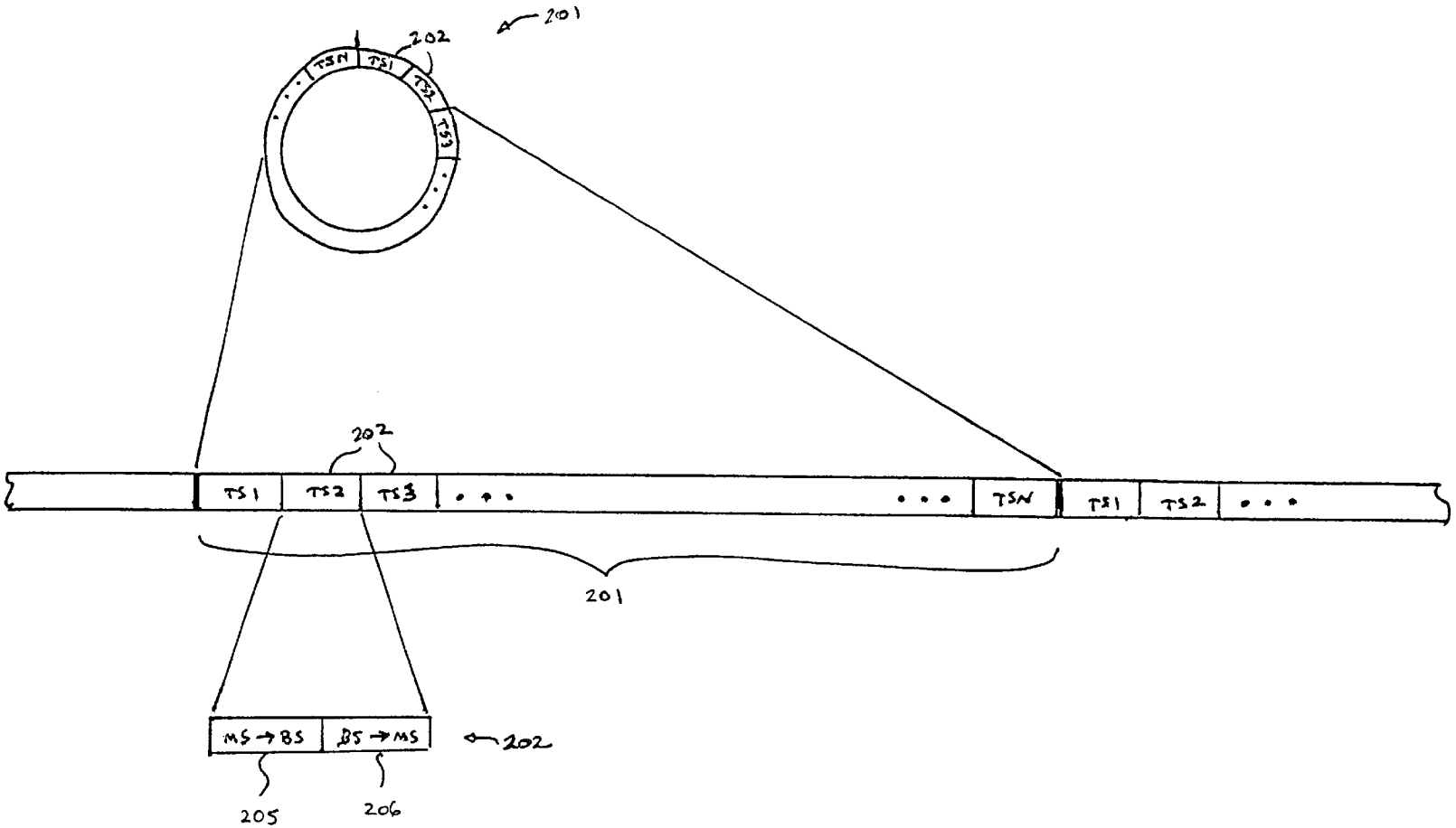
FIGURE 2 (PRIOR ART)
FIG. 2 is a diagram of an exemplary TDD frame structure as known in the art.

FIG. 2 is a diagram of a particular TDD frame structure as known in the art. In FIG. 2, a repeating major time frame 201 comprises a plurality of time slots (or minor time frames) 202. Each time slot 202 can be assigned by the base station 104 to a user station 102. User stations 102 can be assigned more than one time slot 202 if desired, and the time slots 202 so assigned may or may not be contiguous.

As further shown in FIG. 2, each time slot 202 comprises two time segments 205, 206. In the first (i.e., user transmission) time segment 205, the user station 102 to which the time slot 202 is assigned transmits a user-to-base message 211 to the base station 104. In the second (i.e., base transmission) time segment 206, the base station 104 transmits a base-to-user message 212 to the user station 102 to which the time slot 202 is assigned. Each user station 102 thereby transmits and receives in its assigned time slot 202, thus allowing multiple user stations 102 to communicate with the same base station 104.

Figure 4:
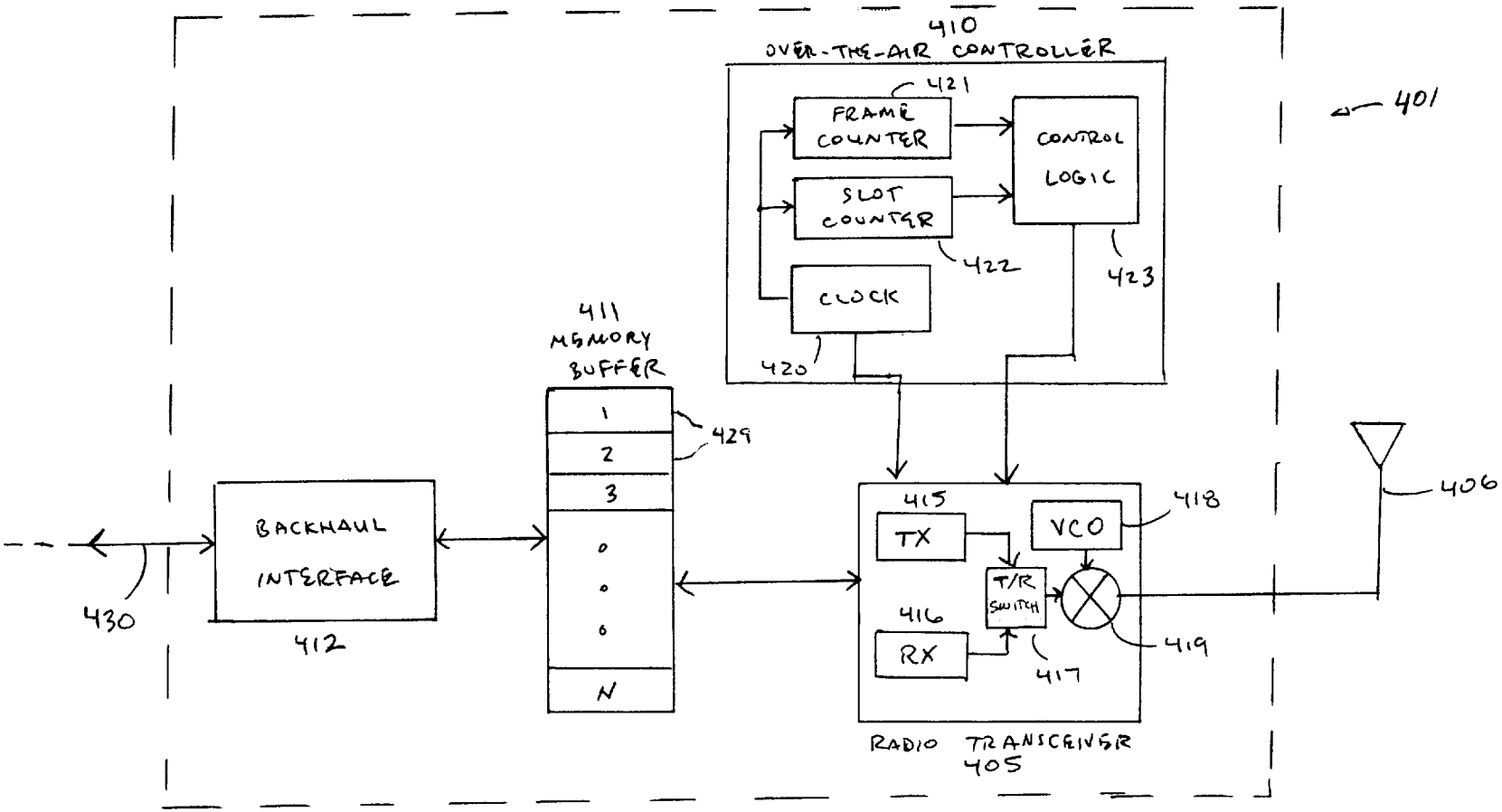
FIG. 4 is a block diagram of a base station as known in the art for carrying out time division duplex communication.

FIG. 4 is a block diagram of a base station 401 as known in the art for communicating according to an over-the-air TDD protocol such as shown in FIG. 2. As shown in FIG. 4, the base station 401 comprises a radio transceiver 405 (comprising a transmitter 415 and a receiver 416), an antenna 406 connected to the radio transceiver 405, and an over-the-air controller 410 also connected to the radio transceiver 405. The over-the-air controller 410 is connected to a memory buffer 411, which the over-the-air controller 410 shares with a backhaul line controller 412. The over-the-air controller 410 oversees retrieval of information from the memory buffer 411 by the radio transceiver 405 for transmission to the various user stations 102 with which the base station 401 communicates, and storage of information into the memory buffer 411 by the radio transceiver 405 when such information is received from the user stations 102. The backhaul line controller 412 removes information from the memory buffer 411 to transmit over a backhaul line 430 to the network, and stores information from the backhaul line 430 received from the network in the memory buffer 411, so as to make it available for the radio transceiver 405. In this manner, information is passed from the user stations 102 to the network, and back, so that telephone calls or similar communication links can be supported.

FIG. 4 also shows further details of the over-the-air controller 410. As shown therein, the over-the-air controller 410 comprises a clock 420 connected to a time frame counter 421 and a time slot counter 422. The time frame counter 421 and time slot counter 422 are connected to control logic 423, which uses outputs from the time frame counter 421 and time slot counter 422 to format messages for over-the-air communication. Under control of the over-the-air controller 410, the radio transceiver 405 stores and removes information from the memory buffer 411.

The radio transceiver 405 further comprises a transmit/receive (T/R) switch 417 to allow selection between a transmission mode and a reception mode. The control logic 423 of the over-the-air controller 410 controls the T/R switch 417, and thereby selects between the transmission mode and reception mode based, for example, upon the current portion of the time frame. Thus, if the base station 401 is operating using the time frame 201 of FIG. 2, then the over-the-air controller 410 selects a reception mode during the user transmission time segment 205 of each time slot 202, and selects the position of the T/R switch 417 accordingly. Similarly, the over-the-air controller 410 selects a transmission mode during the base transmission time segment 206 of each time slot 202, and selects the position of the T/R switch 417 accordingly.

To facilitate rapid or convenient storage and extraction of data, the memory buffer 411 may be partitioned into memory segments 429, each memory segment 429 corresponding to one time slot 202. In one embodiment, for example, the current time slot (as output from, for example, the slot counter 422) can be used as a pointer offset to control which memory segment 429 the radio transceiver 405 is accessing at a given time. The memory segments 429 can be organized such that the data for the user transmission time segment 206 and data for the base transmission time segment 205 are stored adjacent to one another. Alternatively, the memory segments 429 can be organized such that the data for all of the user transmission time segments 206 are stored in one half of the memory buffer 411, and the data for all of the base transmission time segments 205 are stored in the other half of the memory buffer 411. In such a case, the control signal for the T/R switch 417 can be used as an additional pointer offset to control whether the radio transceiver 405 will access the "upper" half of the memory buffer 411 or the "lower" half of the memory buffer 411 (i.e., the user transmission data or the base transmission data).

The base station 401 shown in FIG. 4 may also provide for selection of transmission and reception frequency, so as to allow deployment of the base station 401 in a cellular environment in which different cells 103 (see FIG. 1) are assigned a different frequencies (consistent with a repeating pattern, such as a three-cell or seven-cell repeating pattern, as disclosed, for example, in U.S. Pat. No. 5,402,413, incorporated herein by reference as if set forth fully herein). The base station 401 can be deployed with the desired frequency by, for example, selecting external switches on the base station 401 or programming the desired frequency using software or firmware of the over-the-air controller 410. In the base station 401 shown in FIG. 4, the radio transceiver 405 comprises a programmable voltage-controlled oscillator 418, which is responsive to a control signal (e.g., control bits) from the over-the-air controller 410 and generates an output frequency according to such a control signal. Because the base station 401 implements a TDD time frame 201 such as shown in FIG. 2, it uses the same frequency for transmission and reception.

Figure 3:
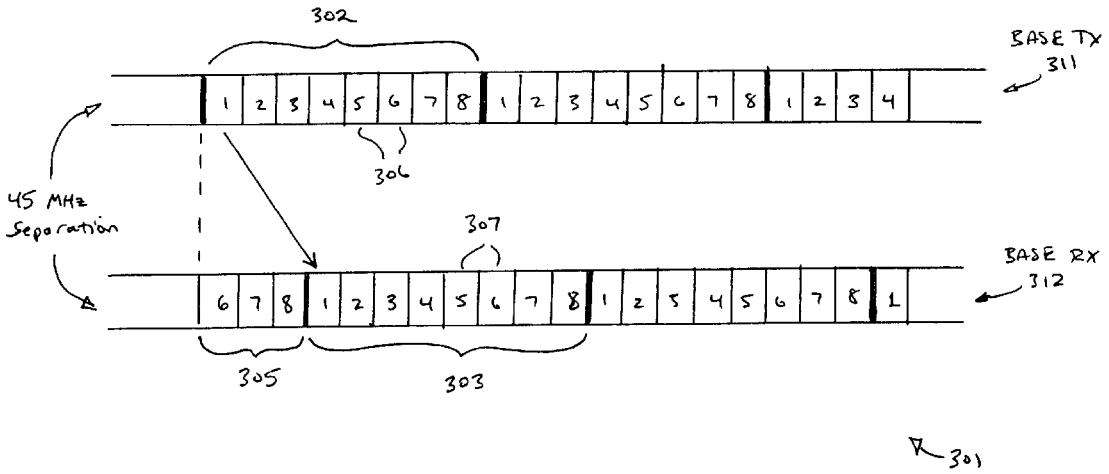
FIG. 3 (PRIOR ART)
FIG. 3 is a diagram of a GSM frame structure.

FIG. 3 is a diagram showing a different over-the-air frame structure 301, commonly associated with a conventional GSM system. As shown in FIG. 3, a base transmission time frame 302 is defined over a base transmission frequency 311, and a user transmission time frame 303 is defined over a base reception frequency 312. The base transmission frequency 311 and base reception frequency 312 are separated by a predefined frequency separation (e.g., 45 MHz).

The base transmission time frame 302 comprises a number of base transmission time slots 306 of equal duration. Likewise, the user transmission time frame 303 comprises a number of user transmission time slots 307 of equal duration. Both the base transmission time frame 302 and the user transmission time frame 303 have the same number of time slots 306, 307, such as eight time slots 306, 307 apiece.

In operation, a GSM base station transmits forward-link transmissions during the base transmission time slots 306 and receives reverse-link transmissions during the user transmission time slots 307. The user transmission time frame 303 is "offset" by a predefined duration 305 (e.g., three time slots 306 or 307) from the base transmission time frame 302, so as to allow the user stations 302 a sufficient "turn-around" switching time and information processing time, and also to allow propagation of the forward-link messages to the user stations 102.

Figure 5:
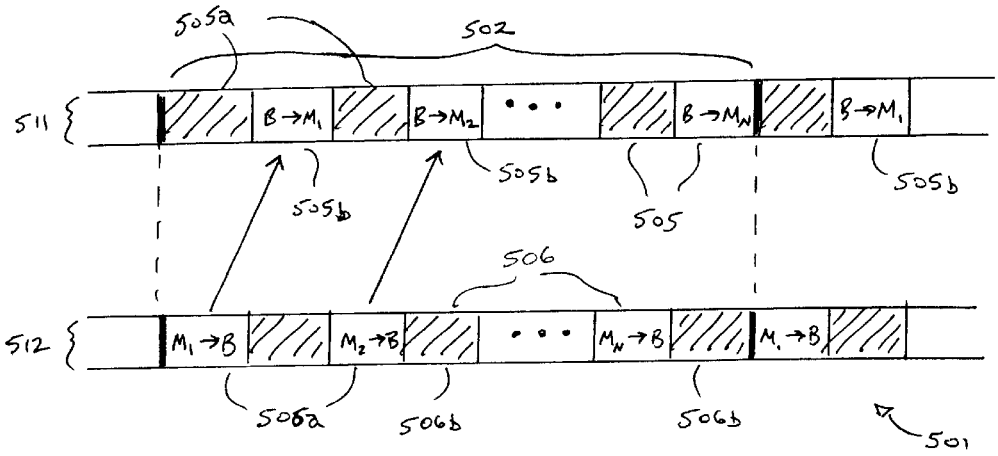
FIG. 5 is a diagram of a frame structure for half-capacity FDD communication that can be supported by modifying the base station shown in FIG. 4.

According to one embodiment disclosed herein, a TDD base station (such as base station 401 shown in FIG. 4)

which is otherwise capable of supporting a TDD time frame (such as time frame 201 shown in FIG. 2) is adapted to operate in an FDD environment and in general accordance with an FDD frame structure such as shown in, for example, FIG. 3 (or other suitable FDD frame structure). In one embodiment, the TDD base station 401 is modified so as to transmit and receive in a repeating pattern as shown by the frame structure 501 in FIG. 5. As shown in FIG. 5, a time frame 502 comprises a plurality of base transmit time slots 505 over a base transmission frequency band 511, and a plurality of base receive time slots 506 over a user transmission frequency band 512 (also referred to as a base reception frequency band). Transmissions from user stations 102, conducted over the user transmission frequency band 512, alternate in time with transmissions from the base station 104, conducted over the base transmission frequency band 511. Thus, in the embodiment shown in FIG. 5, the user stations 102 transmit in the odd time slots 506*a* over the user transmission frequency band 512, and the base station 104 transmits in the even time slots 505*b* over the base transmission frequency band 511. The even time slots 506*b* for the user transmission frequency band 512 and the odd time slots 505*a* for the base transmission frequency band 511 remain "dark" or unused.

In the particular embodiment shown in FIG. 5, a duplex pairing of transmissions occurs in adjacent time slots. As shown in FIG. 5, a first user station (designated "M1") transmits to the base station (designated "B") in a first odd time slot 506*a*, and the base station B transmits to the first user station M1 in the first even time slot 505*b* (i.e., the second base transmit time slot 505, the first one being "dark"). Likewise, the second user station (designated "M2") transmits to the base station B in a second odd time slot 506*a* (i.e., the third base receive time slot 506), and the base station B transmits to the second user station M2 in the second even time slot 505*b* (i.e., the fourth base transmit time slot 505, the third one being "dark"). This pattern is repeated for the entirety of the time frame 502, and again for each succeeding time frame 502.

A TDD base station (such as the base station 401 shown in FIG. 4) may be adapted to support the frame structure 501 shown in FIG. 5 by certain adjustments or modifications, including adjustments or modifications (in hardware, software or both) to the over-the-air controller 410. For example, the over-the-air controller 410 may be modified such that it toggles the programmable VCO 418 between the base transmission frequency band 511 and the base reception frequency band 512, synchronized with the timing of the base transmit time slots 505 and base receive time slots 506. Via a control signal, the over-the-air controller 410 selects the base transmission frequency band 511 for the even time slots 505*b* and the base reception frequency band 512 for the odd time slots 506*a*. The over-the-air controller 410 controls the T/R switch 417 of the base station 401 in the same manner as for the frame structure 201 shown in FIG. 2, by selecting it to be in a transmission mode during the even time slots 505*b* and in a reception mode during the odd time slots 506*a*.

Figure 12:
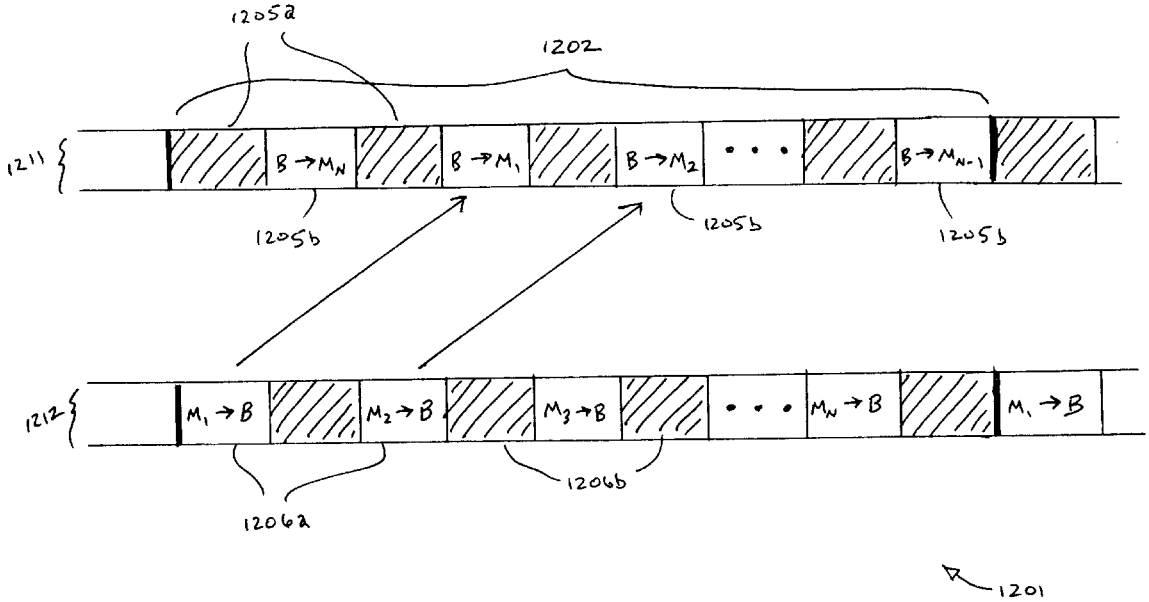
FIG. 12 is a diagram of another frame structure for FDD communication that can be supported by modifying a TDD base station.

If the frame structure 501 of FIG. 5 is not compatible with transmit/receive switching speeds at the user stations 102 (in other words, a user station 102 is not able to transmit in one time slot 506*a* of the user transmission frequency band 512, and then receive in the immediately following time slot 505*b* over the base transmission frequency band 511), an alternative frame structure 1201 is depicted in FIG. 12 which addresses this problem of limited transmit/receive switching time in the user stations 102. The frame structure 1201 shown in FIG. 12 is quite similar to the frame structure 501 shown in FIG. 5, in that user stations 102 transmit in odd time frames 1206*a* and the base station 104 transmits in even time frames 1205*b*. However, a user station 102 does not receive a base transmission from the base station 104 in the base transmit time slot 505*b* immediately following the user station's user transmit time slot 506*a*. Rather, the user transmit time slot 506*a* for a particular user station 102 is paired with a base transmit time slot 505*b* occurring more than one time slot 505 later, so as to allow the user station 102 time to switch between its transmission frequency and its reception frequency.

According to the frame structure 1201 shown in FIG. 12, a user station 102 transmits during its assigned user transmit time slot 506*a*, and later receives during a base transmit time slot 505*b* occurring, for example, three time slots 505 later, giving the user station 102 a time period equal to two time slots 505 to switch between the transmit and receive frequencies. This same principle can be extended, by pairing the user transmit time slot 506*a* with a base transmit time slot 505*b* occurring even later in the time frame 1201.

As a consequence of the splitting apart the forward link and reverse link transmissions from one another in the manner described above, the over-the-air controller 410 of the base station 401 is preferably modified in this embodiment so that the mapping of information into and out of the memory buffer 411 carried out by the radio transceiver 405 (under control of the over-the-air controller 410) is adjusted to account for the time separation between the forward link and reverse link transmissions. To this end, the over-the-air controller 410 may be configured so that it causes the radio transceiver 405 to store and extract packet data in the proper memory segment 429 of the memory buffer 411 corresponding to the particular user station 102. One possible way this can be achieved is through software, by use of a slot offset parameter. In such an embodiment, when the over-the-air controller 410 instructs radio transceiver 405 to extract information from the memory buffer 411 for the base transmit time slot 505*b*, the slot offset parameter is applied such that the information is extracted from the proper location (i.e., proper memory segment 429) in the memory buffer 411. In such a manner, no modifications are necessary for the backhaul line controller 412 (with the possible exception of a timing adjustment to account for the increase in delay between the forward and reverse link information).

Alternatively, a similar result may be achieved by modifying the backhaul line controller 412 in addition or as opposed to the over-the-air controller 410, so as to obtain the desired memory management. In this alternative embodiment, the backhaul line controller 412 may be configured so that it stores information received from the network to be transmitted to a particular user station 102 in the appropriate memory segment 429 of the memory buffer 411. For example, the backhaul line controller 412 would store information received from the network, not in the memory segment 429 for the immediately following base time slot 505*b*, but in the memory segment 429 for the next occurring base time slot 505*b*. The over-the-air controller 410 then causes the radio transceiver 405 to transmit the information in the correct base transmit time slot 505*b*. However, the over-the-air controller 410 is still preferably modified or configured to associate the proper user transmit time slot 506*a* and base transmit time slot 505*a* pair as a single duplex channel, so that the over-the-air controller 410 knows when to instruct the radio transceiver 405 to transmit (or receive) and when to remain dormant or inactive (or to otherwise transmit a dummy pattern) because no user station 102 is assigned to a particular time slot 505 or 506.

Figure 6:
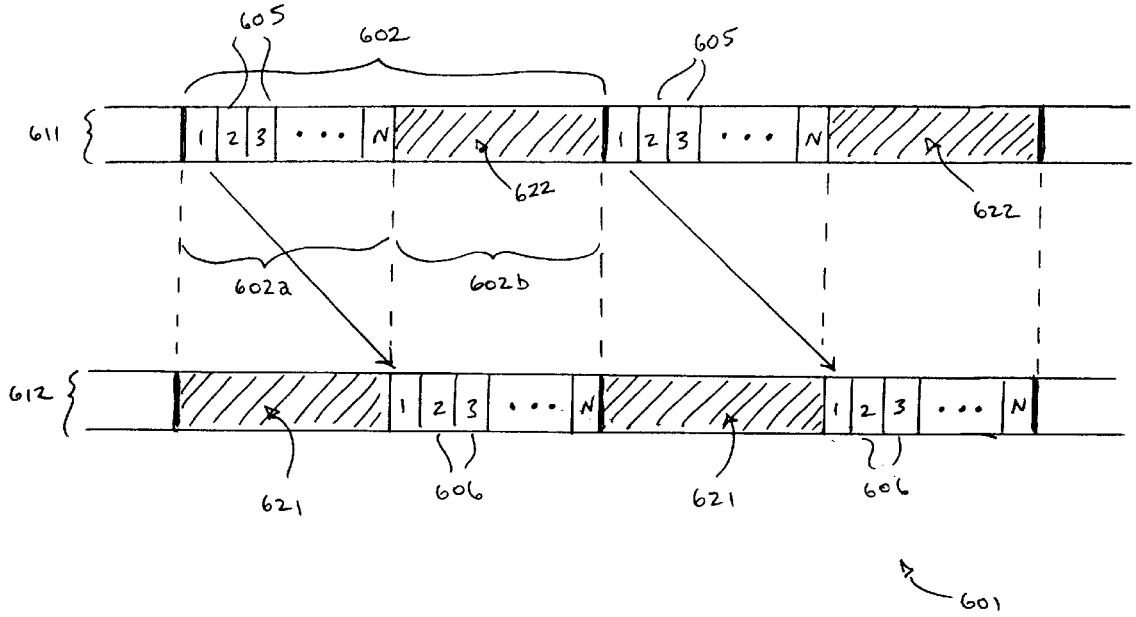
FIG. 6 is a diagram of an alternative frame structure for half-capacity FDD communication that can be supported by modifying the base station shown in FIG. 4.

FIG. 6 shows an alternative inventive frame structure 601 that can be supported using a single TDD base station (such as the base station 401 shown in FIG. 4) with suitable modifications. In the frame structure 601 shown in FIG. 6, a repeating time frame 602 comprises a plurality of base transmit time slots 605 and a plurality of user transmit time slots 606. Each of the base transmit time slots 605 is preferably paired with a corresponding one of the user transmit time slots 606, with such a pair defining a duplex channel for communication (up to N total duplex channels). During the first half 602*a* of the time frame 602, the base station 104 transmits over a base transmission frequency band 611 in each of the base transmit time slot 605 in succession. With respect to the user transmission frequency band 612, the first half 602*a* of the time frame 602 is "dark" or unused. During the second half 602*b* of the time frame 602, the user stations 102 transmit in succession over the user transmission frequency band 612. With regard to the base transmission frequency band 611, the second half 602*b* of the time frame 602 is "dark" or unused.

Certain modifications can be made to a TDD base station (such as the base station 401 shown in FIG. 4) so as to accommodate the frame structure 601 shown in FIG. 6. For example, the over-the-air controller 410 would be modified such that it causes the programmable VCO 418 to toggle between the base transmission frequency 611 and the base reception frequency 612 each half of the time frame 602. The over-the-air controller 410 may, for example, use the output of the time slot counter 422 to determine when to switch between frequencies. The over-the-air controller 410 may further be modified such that it causes the radio transceiver 405 to extract data from the appropriate memory segments 429 of the memory buffer 411 during successive base transmit time slots 605, and to store data in the appropriate memory segments 429 of the memory buffer 411 during successive user transmit time slots 606.

One benefit of the frame structure 601 shown in FIG. 6 is that the user stations 102 should have more than adequate time to switch between their reception and transmission frequencies of the forward link and reverse link. The backhaul line controller 412 of the base station 401 may, however, need to be modified to account for delays introduced by the separation of the forward link and reverse link transmissions over the TDD time frame 201 of FIG. 2.

The frame structure 601 shown in FIG. 6 should be capable of supporting at least as many user stations 102 as the frame structure 501 shown in FIG. 5. However, when considering the transmit/receive switching time of the base station 104, the frame structure 601 of FIG. 6 actually has increased capacity over the frame structure 501 shown in FIG. 5. For the frame structure 501 of FIG. 5, the base station 104 needs to switch between transmit and receive frequencies in between each time slot 506*a*, 505*b*. The transmit/receive switch time results in either less data being transmitted during each time slot 506*a*, 505*b*, or else fewer total user stations 102 being supported for a given time frame 502 (i.e., fewer total time slots 505, 506). For the frame structure 601 shown in FIG. 6, the base station 104 needs to switch between transmit and receive frequencies only twice during an entire time frame 602 (i.e., at the end of the first half 602*a* of the time frame 602 and at the end of the second half 602*b* of the time frame 602). The base transmit time slots 605 and/or user transmit time slots 606 can be made slightly shorter, if necessary, to accommodate the base station transmit/receive turnaround time. If the transmit/receive switch time is significant, an entire base transmit time slot 605 and/or a user transmit time slot 606 of time slot 602 can be made "dark" or unavailable for communication to allow the base station 104 time to switch frequencies during that time slot 605 or 606.

If only one time slot (for example, a user transmit time slot 606) needs to be made dark in order to meet the frequency switching timing requirements, then the base station 104 can use the free base transmit time slot 605 to transmit control or signaling information, or to broadcast current traffic conditions, or for other similar purposes.

In addition to saving time by reducing the number of transmit/receive frequency switches (in comparison to the frame structure 501 shown in FIG. 5, for example), the frame structure 601 of FIG. 6 also saves power, because each transmit/receive frequency switch consumes additional power.

It will be understood by those skilled in the art that other frame structures can also be supported using the same principles as described above, with the base station transmitter active over the base transmission frequency band for approximately half of the time frame, and the base station receiver active over the base reception frequency band for approximately half of the time frame. The pattern of transmit and receive time slots for the base station can vary, and need not be symmetric. For example, an asymmetric time slot pattern may comprise two base transmit time slots, followed by two user transmit time slots, followed by one base transmit time slot, followed by one user transmit time slot, and so on. Also, the number of base transmit time slots and user transmit time slots need not be equal, if it is desired to have more bandwidth in one direction than the other.

Some modifications may be necessary to the communication protocol for which the TDD base station was originally designed in order to support an FDD frame structure, such as the virtual FDD frame structures shown in FIGS. 5 or 6. For example, if the TDD base station as originally designed supports aggregation of time slots 202 to a single user station 102, and such a capability is desired in the FDD system, then the over-the-air controller 410 may be modified to allow such. Assuming a transmit/receive frequency switching time of one time slot or less, the number of aggregated time slots possible in the FDD frame structures of FIGS. 5 and 6 depends primarily upon the offset between the transmit and receive slots for the user stations 102.

The implementation of slot aggregation may be explained by reference to an example. In an illustrative embodiment, the FDD frame structure 601 shown in FIG. 6 may comprise a total of 32 time slots, with 16 of these time slots being base transmit time slots 605 and 16 of these time slots being user transmit time slots 606. An offset of 16 time slots may be provided between the base transmit time slot 605 and a corresponding user transmit time slot 606. In such an embodiment, a single user station 102 may be assigned up to 15 consecutive duplex time slots (i.e., 15 base transmit time slots 605 and their corresponding user transmit time slots 605), with the remaining base transmit time slot 605 being set aside for the user station 102 to switch between the base transmission frequency 611 (a user reception mode) and the user transmission frequency 612 (a user transmission mode), and the remaining user transmit time slot 606 being set aside for the user station 102 to switch between the user transmission frequency 612 (a user transmission mode) and the base transmission frequency 611 (a user reception mode).

Figure 13:
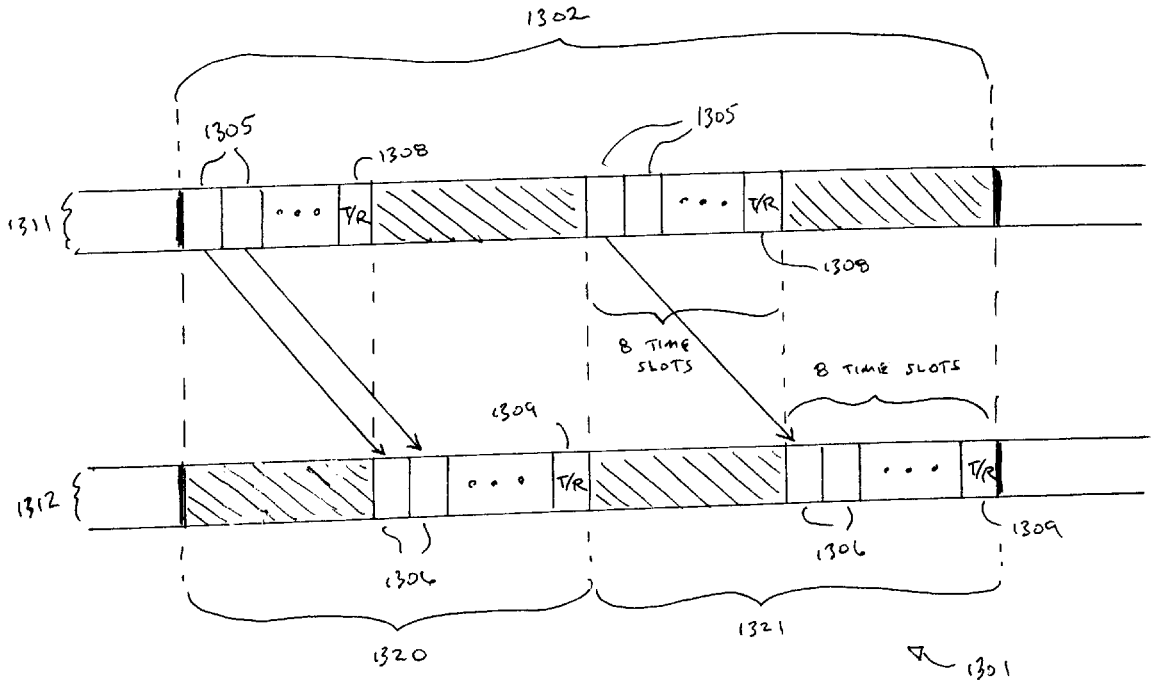
FIG. 13 is a diagram for a frame structure for FDD communication illustrating slot aggregation.

The above example assumes a timing offset of 16 time slots between the base transmit time slots 605 and the corresponding user transmit time slots 606. In alternative frame structures, the amount of potential slot aggregation might be less. For example, if the amount of timing offset were 8 time slots between the base transmit time slot and the user transmit time slot, such as shown in FIG. 13, then the time slot pattern for the frame structure would involve the following: 8 base transmit time slots 1305, followed by 8 user transmit time slots 1306, followed by 8 additional base transmit time slots 1305, followed by 8 additional user transmit time slots 1306. In such a case, the maximum slot aggregation allowed to a single user station 102 is 14 duplex time slots, seven duplex time slots from the first half 1320 of the time frame 1301, and seven duplex time slots from the second half 1321 of the time frame. One duplex time slot (i.e., one base transmit time slot 1305 and one user transmit time slot 1306) from each half 1320, 1321 of the time frame is set aside for the user station 102 to switch between the reception and transmission frequencies 1311, 1312 and back again, as necessary. The time slots 1308, 1309 designated "T/R" in FIG. 13 are used for transmit/receive frequency switching by the user station 102, assuming maximum slot aggregation.

Accordingly, with the frame structure 1301 of FIG. 13, a total of up to 14 duplex time slots may be aggregated to a single user station 102, with two duplex time slots (four individual or half-duplex time slots 1308, 1309) being used for transmit/receive frequency switching.

As a general matter, the smaller the timing offset between transmit time slots and receive time slots, the fewer time slots can be aggregated to a single user station 102. Thus, for example, an offset of four time slots between the base transmit time slot and the user transmit time slot would allow a maximum aggregation of 12 full duplex time slots, with eight half-duplex time slots being used for transmit/receive frequency switching. An offset of two time slots between the base transmit time slot and the user transmit time slot would allow a maximum aggregation of 8 full duplex time slots, with 16 half-duplex time slots being used for transmit/receive frequency switching.

Of course, a user station 102 with a radio transceiver that can transmit and receive simultaneously is not necessarily limited to the number of FDD time slots that can be aggregated in the various FDD frame structures. However, user stations 102 with such a capability are substantially more costly to build. Generally, user stations 102 (e.g., handsets) constructed for use in a TDD system do not have a capability to transmit and receive simultaneously, because such a feature is unnecessary in a TDD environment. Thus, handsets adapted from a TDD setting to an FDD environment would typically be subject to the slot aggregation limitations discussed above.

The amount of slot offset (i.e., timing offset) between base transmit time slots and user transmit time slots may also affect other aspects of the performance of the base station 104, including control traffic. In one embodiment, the base station 104 exchanges control traffic information with a user station 102 in multiple time slots within a time frame. The control traffic can involve alternating transmissions between the base station 104 and the user station 102. Generally, each control traffic message must be processed by the recipient before a responsive control traffic message is transmitted. In the FDD frame structure 601 shown in FIG. 6, control traffic exchanges may be relatively slow due to the size of the offset (i.e., 16 time slots) between the base transmit time slot 605 and the user transmit time slot 606. Ordinarily, only one control traffic exchange will be possible between a base station 104 and a user station 102 within a time frame 602 of the FIG. 6 FDD frame structure 601. However, with a minimal offset (e.g., FIG. 5), the base station 104 and user station 102 could exchange control traffic messages in as many time slots 505, 506 as available, subject to the processing time needed to analyze each control traffic message. The base station 104 and user station 102 therefore could exchange a maximum of 16 control traffic messages, for example, in the FDD frame structure 501 shown in FIG. 5. However, a more realistic number of control traffic exchanges might be four, allowing for transmit/receive frequency switching time and control traffic message processing time.

As a general matter, the larger the slot offset (i.e., timing offset) between the base transmit time slot and the corresponding user transmit time slot, the slower control traffic exchanges can potentially be carried out. On the other hand, maximum potential slot aggregation generally increases by the largest possible slot offset between the base transmit time slot and the corresponding user transmit time slot. Consequently, a tradeoff may need to be made in terms of control traffic speed and maximum possible slot aggregration when considering the timing offset between base transmit time slots and user transmit time slots. The slot offset may ultimately be selected according to the needs of the overall communication system, taking into account whether it is more important within a particular system to have faster control traffic or greater potential slot aggregation. One possible solution to accommodate both needs is to allow for independent slot allocation (i.e., flexible slot offset between base transmit time slot and user transmit time slot); however, this solution generally requires increased complexity in the over-the-air controller and in the backhaul line controller of the base station in terms of overhead and slot maintenance.

Converting a base station from a TDD environment to an FDD environment may affect error correction mechanisms employed at the physical (i.e., RF) layer. For example, in a TDD environment, an ARQ error correction mechanism may be implemented whereby the recipient of the most recently transmitted data packet sends, along with its next data packet transmission, an indication of whether the most recently transmitted data packet was received error free. This indication may take the form of a single field in the message header. The ARQ field may comprise as little as a single bit, with an ARQ acknowledgment ("ACK") bit value indicating successful receipt of the data and an ARQ non-acknowledgment ("NAK") bit value indicating unsuccessful receipt of the data. If the data was not successfully received, then the sender recognizes this fact from the ARQ field (i.e., the NAK indicator), and resends the data in the next immediate data packet transmission. The ARQ error correction method may be applied in a TDD system, regardless of whether time slots are aggregated.

In an FDD system, an ARQ error correction method may also be used, but its working may be somewhat more complicated in situations where FDD slot aggregation is permitted. In an aggregated data mode (i.e., slot aggregation mode), there should be a symmetric number of base transmit time slots and user transmit time slots assigned to the same user station 102, similar to TDD slot aggregation. The ARQ error correction method described above for a TDD environment (i.e., using header bits to indicate successful receipt of the previously received data packet) will work so long as the sender and receiver recognize the circuit as being composed of multiple duplex channels, each of which is preferably treated independently for ARQ purposes.

Accordingly, in one embodiment supporting slot aggregation in an FDD environment, a recipient discovering a packet in error requests its retransmission using an ARQ indicator. In response, the sender retransmits the data packet in the same time slot of the next time frame. To support this approach, the receiver is preferably configured so as to allow insertion of the corrected data packet back into the received stream of data in the same time slot of the time frame following its original transmission. While such a technique allows the ARQ principles of operation to be adapted from the TDD environment to an FDD environment, there potentially can be an impact on data latency, particularly if multiple retransmissions in the same time slot are required. To address this data latency issue, the receiver is preferably configured with a buffer large enough to hold all data packets received since the oldest unresolved error.

The use of an ARQ error correction mechanism may be more difficult if asymmetric data transmission is supported. In a TDD environment, asymmetric data transmission generally involves the allocation of a greater amount of a TDD time slot to one link of the duplex channel than to the other link. For example, the forward link transmission of a TDD time slot may be allocated 75% of the time slot, while the reverse link transmission may in such a case be allocated 25% of the time slot. Asymmetric data transmission, while possible in some TDD systems, is more difficult to implement in an FDD system. This is because channels are assigned in FDD systems as duplex pairs (i.e., one base transmit time slot and one user transmit time slot), and the unused portion of the base transmit time slot cannot, by definition, be used by the user station for transmission, and vice versa, due to the frequency separation between the base station 104 and the user station 102.

In one embodiment using dynamic time slot assignment, more base transmit time slots than user transmit time slots are assigned to a single user station 102, or vice versa, thus allowing a form of asymmetric communication between the base station 104 and the particular user station 102. However, in such a system the ARQ mechanism described above may have difficulty being implemented because there is no uniform match-up between base transmit time slots and user transmit time slots. In this embodiment, control traffic messages may be used to support error correction. For example, the recipient of the larger amount of data may send a control traffic message (e.g., a CT-ARQ message) to the sender providing an acknowledge or non-acknowledge (ACK/NAK) for each time slot of information that has been transmitted since the last CT-ARQ message. While the control traffic (CT-ARQ) message does take some overhead, only one such message need be used to provide error information concerning a multiplicity of time slots. The periodicity of the CT-ARQ message depends primarily on the length of the control traffic message (requiring, in the above-described embodiment, one ARQ bit for each time slot), and the size of the data message buffer at the receiver.

According to the methods and techniques described above, a TDD base station can be adapted to support an FDD frame structure, thereby allowing use of the same equipment to achieve different types of multiple access communication. Being able to employ the same equipment in different multiple access communication environments can achieve reduced cost of equipment design and manufacturing, and may allow those equipment manufacturers and/or service providers that have developed or deployed TDD systems to, in many cases, readily and rapidly convert to FDD systems without substantial re-design effort.

Figure 7:
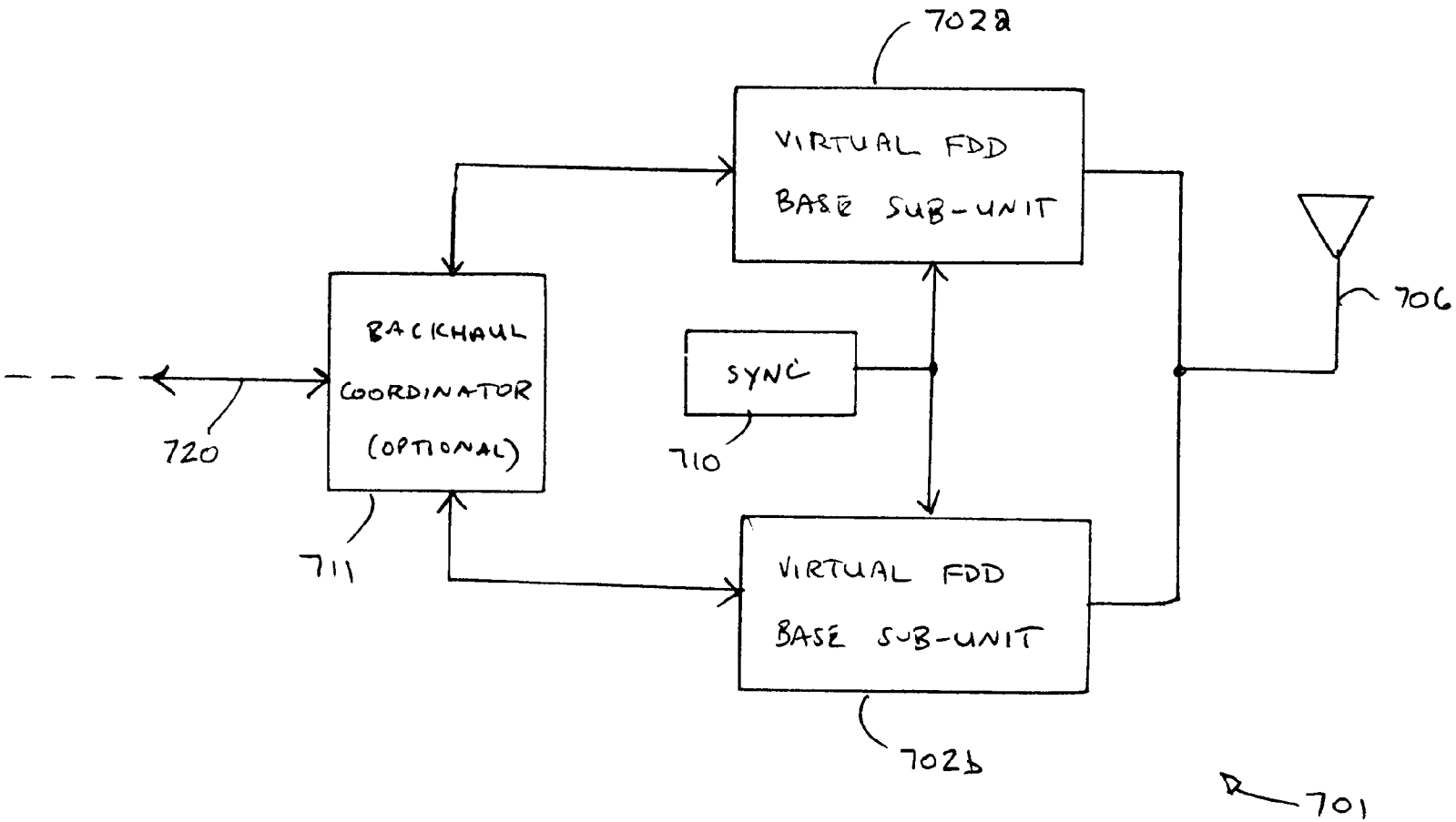
FIG. 7 is a block diagram of one embodiment of a base station comprising two base station sub-units for achieving "virtual" FDD communication.

According to another embodiment, multiple TDD base stations are combined to support full "virtual" FDD communication capability. A preferred embodiment of a virtual FDD base station 701 is shown in FIG. 7, in which a pair of virtual base station sub-units 702*a*, 702*b* interact to support FDD communication. Each virtual base station sub-unit 702*a*, 702*b* may comprise a TDD base station (such as base station 401 shown in FIG. 4) that has been modified to provide for FDD (or virtual FDD) communication according to principles previously described herein. The virtual base station sub-units 702*a*, 702*b* may, if desired, share a common antenna 706, or may alternatively use separate antennas. A backhaul coordinator 711 may be provided to assist in multiplexing data and control information over a common backhaul line 720. The two virtual base station sub-units 702*a*, 702*b* are preferably synchronized, and may, for example, be connected to a common synchronization unit 710, as shown in FIG. 7.

Figure 8:
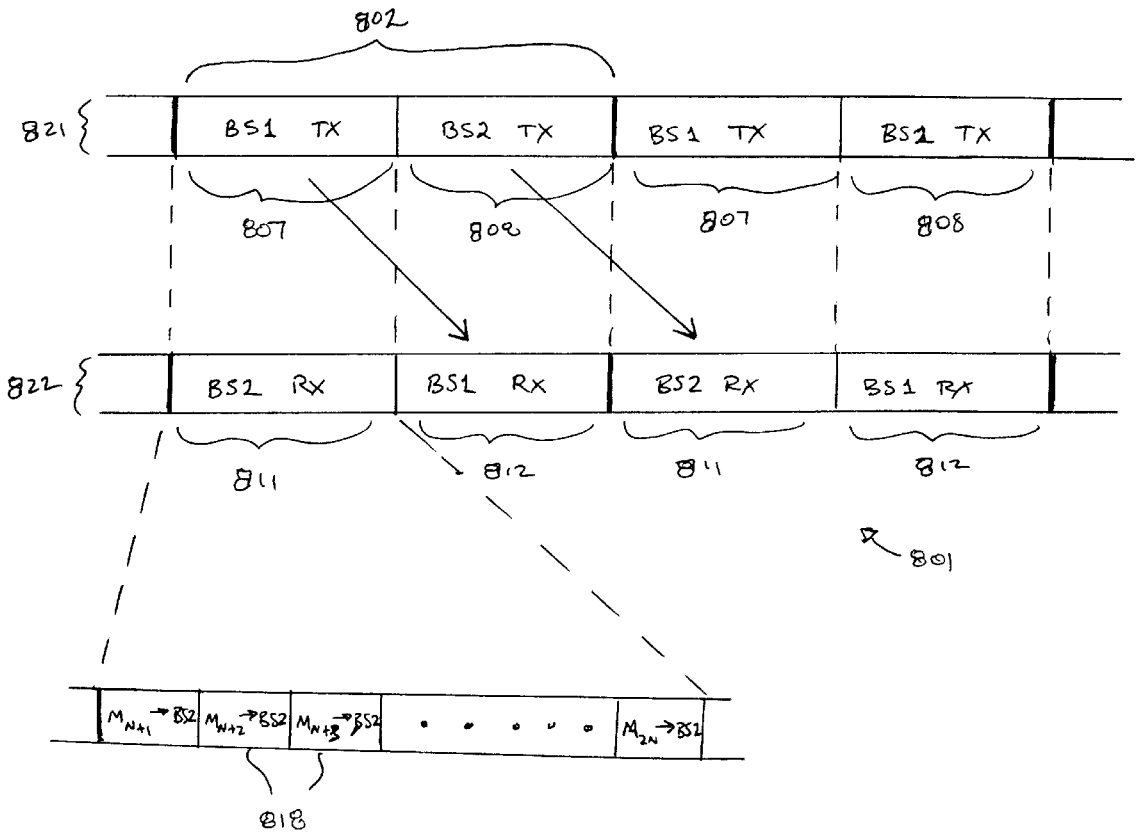
FIG. 8 is a diagram of a frame structure that can be supported by the base station shown in FIG. 7.

FIG. 8 depicts an example of a frame structure 801 that can be supported with the virtual FDD base station 701 shown in FIG. 7. According to the frame structure 801 illustrated in FIG. 8, communication is carried out over a base transmission frequency band 821 and a user transmission frequency band 822. A time frame 802 comprises, with respect to the base transmission frequency band 821, a first half 807 during which the first base station sub-unit 702*a* transmits, and a second half 808 during which the second base station sub-unit 702*b* transmits. The time frame 802 further comprises, with respect to the user transmission frequency band, a first half 811 during which user stations 102 transmit user-to-base messages to the second base station sub-unit 702*b*, and a second half 812 during which user stations 102 transmit user-to-base messages to the first base station sub-unit 702*a*. The first base station sub-unit 702*a* essentially communicates according to the pattern of the frame structure 601 shown in FIG. 6, and the second base-station sub-unit 702*b* essentially communicates in the same pattern, but offset by a half time frame such that the base transmissions from the first base station sub-unit 702*a* do not interfere with the base station transmissions from the second base station sub-unit 702*b*, and the user station transmissions for user stations in communication with either the first base station sub-unit 702*a* or the second base station sub-unit 702*b* do not interfere. In one aspect the frame structure of FIG. 8 may therefore be viewed as an "interleaved" frame structure.

The net effect of the frame structure 801 shown in FIG. 8 is to double the capacity over the frame structure 601 of FIG. 6, by adding a second "modified" TDD base station (i.e., base station sub-unit 702*b*) which is active during the periods that the first "modified" TDD base station (i.e., base station sub-unit 702*a*) is inactive, and vice versa. Together, the two base station sub-units 702*a*, 702*b* support twice as many user stations 102 as either alone could support, using the same frequency resources. If, for example, each base station sub-unit 702*a*, 702*b* supports 16 user stations 102 in full duplex, then the two base station sub-units 702*a*, 702*b* together may support up to 32 user stations in full duplex.

Figure 9:
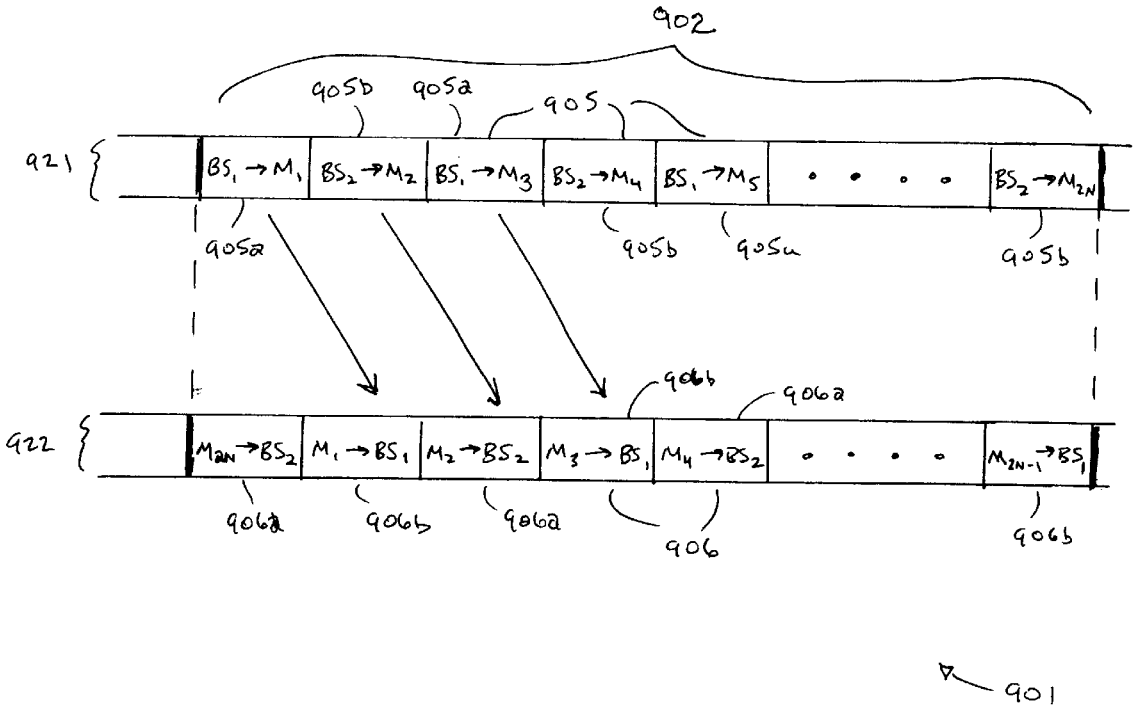
FIG. 9 is a diagram of an alternative frame structure that can be supported by the base station shown in FIG. 7.

FIG. 9 shows an alternative frame structure 901 that can be supported by the virtual FDD base station 701 shown in FIG. 7. According to the frame structure 901 shown in FIG. 9, a time frame 902 is divided into a series of base transmit time slots 905 with respect to a base transmission frequency band 921 and a series of user transmit time slots 906 with respect to a user transmission frequency band 922. To support the time frame 902 shown in FIG. 9, the two base station sub-units 702*a*, 702*b* transmit and receive in alternate time slots. The first base station sub-unit 702*a* transmits during the odd-numbered base transmit time slots 905*a*, and receives during the even-numbered user transmit time slots 906*b*. Conversely, the second base station sub-unit 702*b* transmits during the even-numbered base transmit time slots 905*b*, and receives during the odd-numbered user transmit time slots 906*a*. Each of the base station sub-units 702*a*, 702*b* is essentially configured to support a frame structure similar to that of FIG. 5 (except that the base transmission precedes, rather than follows, the corresponding user transmission), with the effective time frame of the second base station unit 702*b* offset by one time slot from that of the first base station sub-unit 702*a*. In this manner, as with the frame structure of FIG. 8, the virtual FDD base station 701 achieves twice the capacity over the base station configured to support the frame structure of either FIG. 5 or FIG. 6 alone.

In order to achieve the "virtual" FDD frame structure shown in FIG. 8 or 9, the virtual base station sub-units 702*a*, 702*b* are, as previously indicated, preferably synchronized such that the start of each time frame and time slot is coordinated. In one embodiment, a synchronization unit 710 is connected to each of the virtual base station sub-units 702*a*, 702*b* to maintain frame and slot synchronization between them. Alternatively, one of the virtual base station sub-units (e.g., 702*a*) can send a frame signal, slot signal and/or clock signal to the other virtual base station sub-unit (e.g., 702*b*), thereby achieving synchronization using a master-slave clocking method. Alternatively, the first virtual base station sub-unit 702*a* sends only a start-of-frame marker to the other virtual base station sub-unit 702*b*, which then may synchronize its own internal clock(s) using a phase-locked loop. Alternatively, synchronization may be achieved in each virtual base station sub-unit 702*a*, 702*b* by using a timing marker from an external source (such as a base station controller (not shown)) that connects to the base station sub-units 702*a*, 702*b* through the backhaul line 720. A base station controller can also, if desired, connect to other base stations in the same geographic region. Synchronization may also be achieved by providing a GPS receiver in each base station sub-unit 702*a*, 702*b*, or using a similar external timing reference, and communicating start-of-frame information between the two base station sub-units 702*a*, 702*b* if otherwise not provided by the external timing reference.

In addition to synchronizing the virtual base station sub-units 702*a*, 702*b* of the virtual FDD base station 701, it is also preferably to synchronize the base stations 104 (including any of which are embodied as FDD base station 701) within a geographic region. For example, the base stations 104 (see FIG. 1) can be synchronized by receiving a timing marker over a backhaul connection from a common base station controller, or from some other system component connected over the backhaul path. Preferably, base stations 104 within a geographical region are both frame-synchronized and slot-synchronized, which can lead to higher potential capacity, potentially reduced interference, and faster handoffs between base stations 104.

Figure 10:
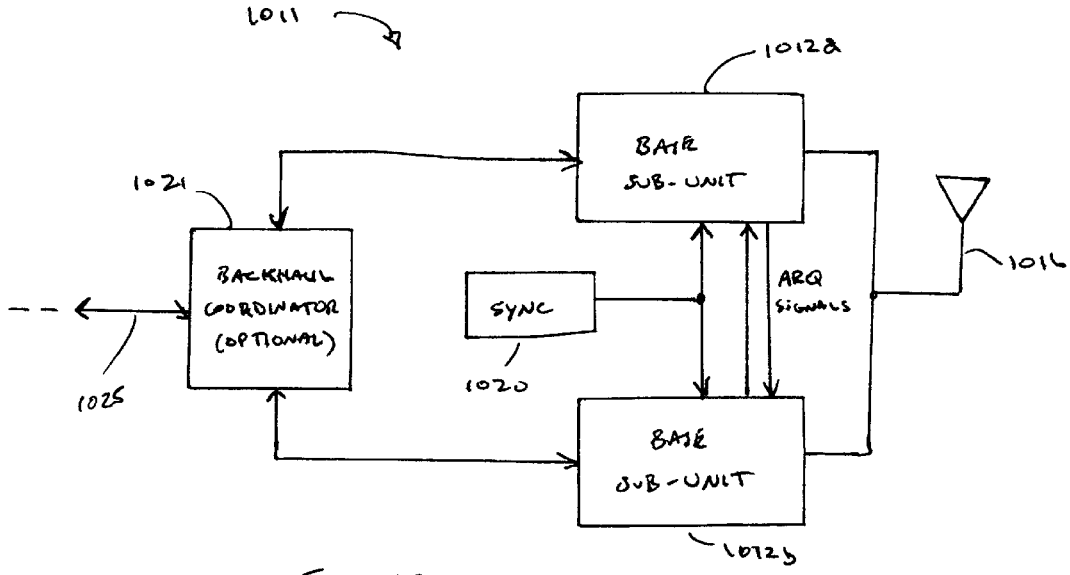
FIG. 10 is a diagram showing additional details of one of the base station sub-units that may be utilized in the base station shown in FIG. 7.

FIG. 10 depicts another embodiment of an FDD base station 1011. As shown in FIG. 10, the FDD base station 1011 comprises a pair of base station sub-units 1012*a*, 1012*b*. The base sub-units 1012*a*, 1012*b* can be connected to a backhaul coordinator 1021 in a manner similar to the base station 701 of FIG. 7, and can also be synchronized using a synchronization unit 1020 similar to that shown in FIG. 7, or by using any other of the aforementioned synchronization methods. Each of the base station sub-units 1012*a*, 1012*b* in FIG. 10 may comprise a TDD base station (such as base station 401 of FIG. 4) that has been modified to operate such that the transmitter of one of the base sub-units (e.g., 1012*a*) operates in a continuous fashion, and the receiver of the other of the base sub-units (e.g., 1012*b*) operates in a continuous fashion. By coordinating operation of the two base station sub-units 1012*a*, 1012*b*, full FDD can be supported.

Figure 11:
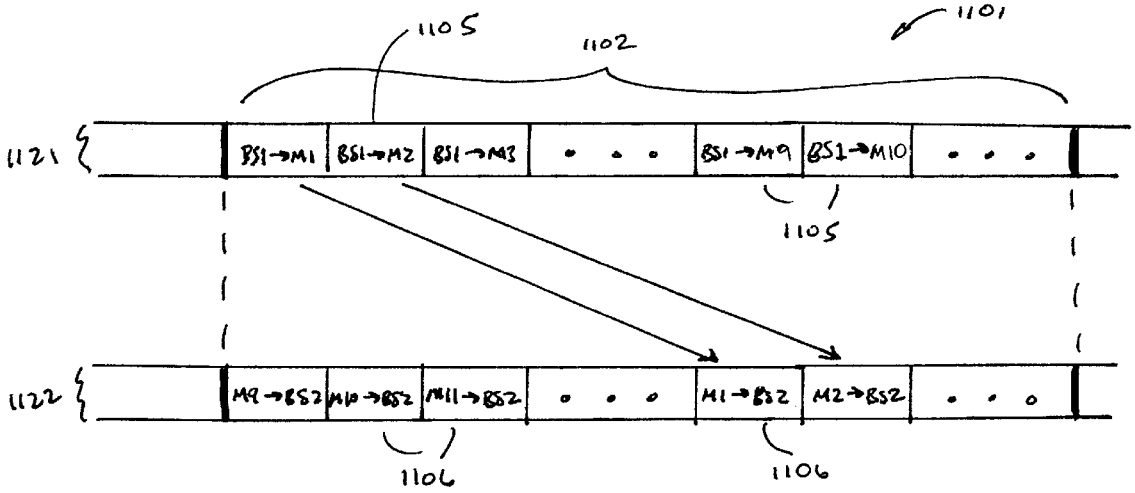
FIG. 11 is a block diagram of another embodiment of a base station for achieving FDD communication.

FIG. 11 depicts an example of an FDD frame structure that can be supported by the base station 1011 of FIG. 10. As shown in FIG. 11, the first base station sub-unit 1012*a* (designated "BS1") transmits, over a base transmission frequency 1121, in each of a plurality of base transmit time slots 1105 of an FDD time frame 1102. The second base station sub-unit 1012*b* (designated "BS2") receives, over a user transmission frequency 1122, in each of a plurality of user transmit time slots 1106 of the FDD time frame 1102. User stations 102 communicating with the base station 1011 are assigned a pair of time slots (a base transmit time slot 1105 and a user transmit time slot 1106) in order to carry out duplex communication. The base transmit time slot 1105 is offset from the corresponding user transmit time slot 1106 in each duplex pair by a predefined duration, such as, e.g., eight time slots (or any other suitable duration). In this manner, the base station 1011 may conduct FDD communication using two "modified" TDD base stations as base station sub-units 1012*a*, 1012*b*.

The backhaul coordinator 1021 interfaces with the next hardware link in the chain to the network. The backhaul coordinator 1021 sends information received over the backhaul line 1025 to the first base station sub-unit 1012*a* for transmission to the user stations 102, and receives information received by the second base station sub-unit 1012*b* from user stations 102 for transmission over the backhaul line 1025.

Certain software or firmware modifications may be employed in the base station sub-units 1012*a*, 1012*b* in order to achieve FDD compatibility. For example, assuming that the base station sub-units 1012*a*, 1012*b* each comprise hardware originally developed for a TDD base station 401 (such as shown in FIG. 4), the first (transmitting) base station sub-unit 1012*a* may be modified such that all of the memory segments 429 in its memory buffer 411 are treated as transmit memory segments, and the second (receiving) base station sub-unit 1012*b* may be modified such that all of the memory segments 429 in its memory buffer 411 are treated as receive memory segments. In such a case, the backhaul interface 412 of the first base station sub-unit 1012*a* is thereby provided with capability to store information received from the backhaul coordinator 1021 in all of the memory segments 429 of the memory buffer 411 (one memory segment 429 for each base transmit time slot 1105), and the over-the-air controller 410 is modified so that it removes information from all of the memory segments 429 of the memory buffer 411 as appropriate for the sending of data packets in the base transmit time slots 1105. Similarly, the backhaul interface 412 of the second base station sub-unit 1012*b* is provided with the capability to remove information from all of the memory segments 429 (one memory segment 429 for each user transmit time slot 1106) of the memory buffer 411 as appropriate for sending to the backhaul coordinator 1021 and, ultimately, to the network, and the over-the-air controller 410 is modified so that it stores information in all of the memory segments 429 of the memory buffer 411, each data packet of information being stored in a memory segment 429 according to the user transmit time slot 1106 in which it was received.

The base station 1011 of FIG. 10 may also comprise a mechanism for coordinating error correction between the two base station sub-units 1012*a*, 1012*b*. For example, if a data packet is received in error, the second base station sub-unit 1012*b* may send the first base station sub-unit 1012*a* an indication that an error was received and which time slot the error occurred in. The first base station sub-unit 1012*a* then may send an ARQ message (i.e., a re-transmit request) to the user station 102 in the appropriate base transmit time slot 1105. Similarly, if the second base station sub-unit 1012*b* receives an ARQ message from a user station 102, it will send the ARQ message and a time slot indicator to the first base station sub-unit 1012*a*, which can then re-send the data packet in the appropriate base transmit time slot 1105.

The principles of the present invention are applicable to both mobile and fixed systems, and the embodiments disclosed herein may be deployed in a mobile communication environment or a fixed wireless local-loop system.

In a preferred embodiment, the base station 104 and user stations 102 communicate using spread spectrum communication. Each of the embodiments previously described can be configured to operate using spread spectrum communication. Suitable spread spectrum transmission and reception techniques are described, for example, in U.S. Pat. Nos. 5,016,255, 5,022,047 or 5,659,574, each of which is assigned to the assignee of the present invention, and each of which is hereby incorporated as if fully set forth herein. Different cells 103 (see FIG. 1) may be assigned different spread spectrum codes (or different sets of spread spectrum codes, from which individual codes may be temporarily assigned to individual user stations 102), thereby obtaining benefits of CDMA.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A communication system for virtual FDD communication, comprising:

a first base station sub-unit, said first base station sub-unit comprising a first transmitter for transmitting a first plurality of base-to-user messages to a first plurality of user stations only during a first half of a repeating time frame, said first base station sub-unit further comprising a first receiver for receiving a first plurality of user-to-base messages from said first plurality of user stations only during a second half of said repeating time frame; and a second base station sub-unit collocated with said first base station sub-unit, said second base station sub-unit comprising a second transmitter for transmitting a second plurality of base-to-user messages to a second plurality of user stations only during said second half of said repeating time frame, said second base station sub-unit further comprising a second receiver for receiving a second plurality of user-to-base messages from said second plurality of user stations only during said first half of said repeating time frame.

2. The communication system of claim 1, further comprising means for synchronizing said first base station sub-unit and said second base station sub-unit.

3. The communication system of claim 2, wherein said means for synchronizing comprises a synchronization unit connected to said first base station sub-unit and said second base station sub-unit, said synchronization unit providing a time frame marker and a time slot marker to said first base station sub-unit and said second base station sub-unit.

4. The communication system of claim 2, wherein said means for synchronizing comprises a master-slave clock connection between said first base station sub-unit and said second base station sub-unit.

5. The communication system of claim 2, wherein said means for synchronizing comprises a time frame marker signal from a base station controller connected to both said first base station sub-unit and said second base station sub-unit.

6. The communication system of claim 1, wherein said first base station sub-unit and said second base station sub-unit share at least one common antenna.

7. The communication system of claim 1, further comprising a backhaul interface connected to said first base station sub-unit and said second base station sub-unit, said backhaul interface providing multiplexing and de-multiplexing of communication channels over a backhaul signal line.

8. The communication system of claim 1, wherein said first base station sub-unit communicates with each of said first plurality of user stations in a duplex time slot assigned to the user station, and wherein said second base station sub-unit communicates with each of said second plurality of user stations in a duplex time slot assigned to the user station.

9. The communication system of claim 8, wherein said first plurality of base-to-user messages are interleaved with said second plurality of base-to-user messages, and wherein said first plurality of user-to-base messages are interleaved with said second plurality of user-to-base messages.

10. The communication system of claim 8, wherein said first plurality of base-to-user messages are consecutive without any intervening base-to-user message of said second plurality of base-to-user messages, wherein said second plurality of base-to-user messages are consecutive without any intervening base-to-user message of said first plurality of base-to-user messages, wherein said first plurality of user-to-base messages are consecutive without any intervening user-to-base message of said second plurality of user-to-base messages, and wherein said second plurality of user-to-base messages are consecutive without any intervening user-to-base message of said first plurality of user-to-base messages.

11. A method for FDD communication, comprising:

generating a repeating time frame;

generating a first plurality of duplex time slots and a second plurality of duplex time slots in said time frame, each duplex time slot of said first plurality of duplex time slots comprising a base transmit time slot within a first half of said time frame and a user transmit time slot within a second half of said time frame, and each duplex time slot of said second plurality of duplex time slots comprising a base transmit time slot within said second half of said time frame and a user transmit time slot within said first half of said time frame, and wherein the base transmit time slot of each duplex time slot bears the same temporal relationship with its respective user transmit time slot;

assigning, on demand, said first plurality of duplex time slots and said second plurality of duplex time slots to user stations for communication with the base station;

transmitting, over a base transmit frequency band and from a first base station sub-unit, a first plurality of base-to-user messages during the base transmit time slots of said first plurality of duplex time slots;

receiving said first plurality of base-to-user messages at a first plurality of said user stations;

transmitting, over a base transmit frequency band and from a second base station sub-unit, a second plurality of base-to-user messages during the base transmit time slots of said second plurality of duplex time slots;

receiving said second plurality of base-to-user messages at a second plurality of said user stations;

transmitting, over a user transmit frequency band and from said first plurality of user stations, a first plurality of user-to-base messages during the user transmit time slots of said first plurality of duplex time slots;

receiving said first plurality of user-to-base messages at said first base station sub-unit;

transmitting, over said user transmit frequency band and from said second plurality of user stations, a second plurality of user-to-base messages during the user transmit time slots of said second plurality of duplex time slots; and receiving said second plurality of user-to-base messages at said second base station sub-unit.

12. The method of claim 11, wherein said first half of said time frame and said second half of said time frame each comprise a contiguous portion of said time frame.

13. The method of claim 11, wherein said first half of said time frame and said second half of said time frame each comprise non-contiguous portions of said time frame, such that base transmit time slots of said first plurality of duplex time slots are interleaved with base transmit time slots of said second plurality of duplex time slots, and user transmit time slots of said first plurality of duplex time slots are interleaved with user transmit time slots of said second plurality of duplex time slots.

14. The method of claim 13, wherein said base transmit time slots of said first plurality of duplex time slots alternate with the base transmit time slots of said second plurality of duplex time slots, and wherein said user transmit time slots of said first plurality of duplex time slots alternate with the user transmit time slots of said second plurality of duplex time slots.

15. The method of claim 14, wherein the base transmit time slot and user transmit time slot of each duplex time slot are separated by at least one time slot.

16. The method of claim 11, wherein generating a repeating time frame comprises synchronizing said first base station sub-unit and said second base station sub-unit.

17. A method for FDD communication, comprising:

generating a repetitive time frame;

allocating a first portion of said time frame to a first base station sub-unit for transmitting a first plurality of base-to-user messages to a first plurality of user stations over a base transmit frequency band;

allocating a second portion of said time frame to a second base station sub-unit for transmitting a second plurality of base-to-user messages to a second plurality of user stations over said base transmit frequency band, said first portion of said time frame and said second portion of said time frame comprising substantially the entirety of said time frame;

allocating said second portion of said time frame to said first base station sub-unit for receiving a first plurality of user-to-base messages from said first plurality of user stations over a user transmit frequency band; and allocating said first portion of said time frame to said second base station sub-unit for receiving a second plurality of user-to-base messages from said second plurality of user stations over said user transmit frequency band.

18. The method of claim 17, wherein generating a repetitive time frame comprises synchronizing said first base station sub-unit and said second base station sub-unit.

19. The method of claim 17, wherein said first base station sub-unit and said second base station sub-unit each transmit base-to-user messages and receive user-to-base messages in duplex time slots assigned to said first plurality of user stations and said second plurality of user stations.

20. A method for communication, comprising:

generating a time frame at a base station;

generating a plurality of time slots within said time frame;

assigning pairs of said time slots for duplex communication to a plurality of user stations on demand, each pair of time slots comprising a user transmit time slot and a base transmit time slot, such that no more than half of said time slots are assigned as user transmit time slots and no more than half of said time slots are assigned as base transmit time slots, and wherein each user transmit time slot from each pair of time slots is separated temporarily from its respective base transmit time slot in the pair by the same amount;

transmitting, over a base transmission frequency band, base-to-user messages from the base station to said user stations during said base transmit time slots;

receiving said base-to-user messages at said user stations, each user station receiving a base-to-user message in its assigned base transmit time slot;

transmitting, over a user transmission frequency band separate and distinct from said base transmission frequency band, user-to-base messages from said user stations to the base station during said user transmit time slots, each user station transmitting a user-to-base message in its assigned user transmit time slot; and receiving said user-to-base messages at the base station.

21. The method of claim 20 wherein said base transmit time slots alternate with said user transmit time slots.

22. The method of claim 20 wherein all of said base transmit time slots are consecutive without any intervening user transmit time slots, and wherein all of said user transmit time slots are consecutive without any intervening base transmit time slots.

23. A base station, comprising:

a radio transceiver, said radio transceiver comprising a base transmitter and a base receiver selectably connected to at least one base antenna by a transmit/receive switch, and said radio transceiver further comprising a voltage controlled oscillator whereby a transmission/reception frequency of said radio transceiver is set;

a memory buffer connected to said radio transceiver, said memory buffer partitioned into a plurality of memory segments according to separate time division duplex communication channels, one memory segment for each such time division duplex communication channel;

an over-the-air controller connected to said radio transceiver, said over-the-air controller comprising a time frame counter and a time slot counter;

a toggle signal output from said over-the-air controller to said transmit/receive switch, said toggle signal causing said base transmitter and base receiver to be alternately connected to said at least one base antenna;

a frequency selection signal output from said over-the-air controller to the voltage controlled oscillator of said radio transceiver, said frequency selection signal causing said radio transceiver to alternate between a base transmit frequency band and a base receive frequency band, said base transmit frequency band being selected when said base transmitter is connected to said at least one base antenna, and said base receive frequency band being selected when said base receiver is connected to said at least one base antenna; and a backhaul interface connected to said memory buffer, said backhaul interface multiplexing information from said memory buffer for transmission over a backhaul line, and demultiplexing information received over said backhaul line for storage in said memory buffer.

24. The base station of claim 23, wherein said toggle signal switches states with each change in state of said time slot counter.

25. The base station of claim 23, wherein said toggle signal switches states in response to said time slot counter, each time a predetermined number of time slots are counted.

26. A method for frequency division duplex (FDD) communication, comprising:

generating a repeating time frame;

generating a first plurality of duplex time slots and a second plurality of duplex time slots in the time frame, each duplex time slot of the first plurality of duplex time slots comprising a base transmit time slot within a first half of the time frame and a user transmit time slot within a second half of the time frame, each duplex time slot of the second plurality of duplex time slots comprising a base transmit time slot within the second half of the time frame and a user transmit time slot within the first half of the time frame;

assigning at least a portion of the first plurality of duplex time slots and the second plurality of duplex time slots to user stations;

transmitting a first plurality of base-to-user messages to a first plurality of the user stations from a first base station sub-unit over a base transmit frequency band during the base transmit time slots of the first plurality of duplex time slots;

transmitting a second plurality of base-to-user messages to a second plurality of the user stations from a second base station sub-unit over the base transmit frequency band during the base transmit time slots of the second plurality of duplex time slots;

receiving a first plurality of user-to-base messages from the first plurality of user stations at the first base station sub-unit over a user transmit frequency band during the user transmit time slots of the first plurality of duplex time slots; and receiving a second plurality of user-to-base messages from the second plurality of user stations at the second base station sub-unit over the user transmit frequency band during the user transmit time slots of the second plurality of duplex time slots.

27. A method for communication, comprising:

generating a time frame;

generating a plurality of time slots within the time frame;

assigning pairs of the time slots for duplex communication to a plurality of user stations, each pair of time slots comprising a user transmit time slot and a base transmit time slot, no more than half of the time slots assigned as user transmit time slots and no more than half of the time slots assigned as base transmit time slots;

transmitting base-to-user messages from a base station to the user stations over a base transmission frequency band during the base transmit time slots; and receiving user-to-base messages from the user stations at the base station over a user transmission frequency band separate and distinct from the base transmission frequency band during the user transmit time slots.

* * * * *